(12) United States Patent
Cornwall

(10) Patent No.: US 10,627,329 B1
(45) Date of Patent: Apr. 21, 2020

(54) PIPE TESTER DEVICE

(71) Applicant: Kenneth R. Cornwall, Johns Creek, GA (US)

(72) Inventor: Kenneth R. Cornwall, Johns Creek, GA (US)

(73) Assignee: ProVent Systems, Inc., Lawrenceville, GA (US)

( * ) Notice: Subject to any disclaimer, the term of this patent is extended or adjusted under 35 U.S.C. 154(b) by 76 days.

(21) Appl. No.: 16/163,718

(22) Filed: Oct. 18, 2018

(51) Int. Cl.
| | | |
|---|---|---|
| *F16L 21/06* | (2006.01) | |
| *F16L 51/00* | (2006.01) | |
| *G01N 3/12* | (2006.01) | |
| *G01M 3/28* | (2006.01) | |
| *F16L 55/136* | (2006.01) | |

(52) U.S. Cl.
CPC ............... *G01N 3/12* (2013.01); *F16L 21/06* (2013.01); *F16L 55/136* (2013.01); *G01M 3/2815* (2013.01); *F16L 2201/30* (2013.01)

(58) Field of Classification Search
CPC ............ F16L 51/00; F16L 21/06; F16L 27/12
USPC ............. 138/90; 73/49.1, 46, 49.8; 137/254; 220/234; 285/108; 277/315, 320
See application file for complete search history.

(56) References Cited

U.S. PATENT DOCUMENTS

| | | | | |
|---|---|---|---|---|
| 1,133,714 A | * | 3/1915 | Elder ..................... | F16L 55/136 138/90 |
| 3,479,066 A | | 11/1969 | Gittleman | |
| 3,495,856 A | | 2/1970 | Daymond | |
| 3,913,382 A | | 10/1975 | Kurose et al. | |
| 4,420,176 A | | 12/1983 | Cornwall | |
| 4,429,568 A | * | 2/1984 | Sullivan ................ | G01M 3/022 138/90 |
| 4,542,642 A | * | 9/1985 | Tagliarino ............. | G01M 3/022 138/90 |
| 7,013,711 B1 | * | 3/2006 | Herbers ............... | G01M 3/2815 73/49.1 |
| 8,210,029 B2 | * | 7/2012 | Hart ...................... | G01M 3/022 73/37 |
| 9,982,823 B1 | | 5/2018 | Cornwall | |

(Continued)

OTHER PUBLICATIONS

Main Link Industries Inc., "Products", believed to have been published no later than Feb. 14, 2017.

(Continued)

*Primary Examiner* — Patrick F Brinson
(74) *Attorney, Agent, or Firm* — Bryan W. Bockhop; Bockhop Intellectual Property Law, LLC

(57) ABSTRACT

A pipe tester connector includes rigid cylindrical member. The rigid cylindrical member defines a first side hole. A continuous flexible cup member includes circular floor portion and a central tubular portion extending upwardly therefrom. A first flexible sleeve extends from the top of the flexible cup. The first flexible sleeve has a folded down first position and a folded up second position, in which it envelopes the end of the first pipe. A first hose clamp secures the flexible sleeve to the pipe. An attachment unit includes a rigid insert, an attachment pipe, a first adapter and an attachment. The rigid insert is disposed against the tubular portion of the interior surface of the flexible cup. The rigid insert defines a hole in alignment with the first side hole and the second side hole, through which the attachment pipe passes. An adapter is affixed to the attachment pipe.

20 Claims, 3 Drawing Sheets

(56) References Cited

U.S. PATENT DOCUMENTS

2008/0184783 A1* 8/2008 Chromey ............... G01M 3/02
73/49.5

OTHER PUBLICATIONS

Roofmaster Drains & Vents, "4" XJ Fernco Expansion Joint, believed to have been published no later than Feb. 14, 2017.

* cited by examiner

PIPE TESTER DEVICE

BACKGROUND OF THE INVENTION

1. Field of the Invention

The present invention relates to plumbing devices and, more specifically, to a device for pressure testing pipes.

2. Description of the Related Art

Pipes installed in buildings, such as drain/waste/vent (DWV) pipes, must be integrity tested during installation to ensure that they will not leak during normal use. In one method of testing, a plumber will plug a section of pipe with a test plug and will then fill the section of pipe with a column of water to a predetermined height. Once filled, the pipe is inspected for leaks and then the water is drained out of the pipe section.

A typical existing method of testing plumbing draining systems during construction of multi-story buildings involves installing a test tee fitting into the piping at every interval needed to be water tested. Such a test tee includes a brass cleanout that is used to access the pipe and to make the test tee water tight after the test. During a test, the brass cleanout is removed and a testing apparatus is coupled to the pipe through the test tee. After the test, the brass cleanout is reinstalled.

Because test tees are permanently installed in a pipe, use of test tees can be quite expensive, especially in high rise buildings. Also, because they are permanently installed, test tees are not reusable.

When most PVC DWV pipes are installed in multi-story construction, the pipes are fitted with expansion fittings at each story to allow for expansion and contraction of the pipes during normal use. Typical expansion fittings include a flexible section that is placed in a gap between two sections of pipe and affixed to each section.

Therefore, there is a need for a pipe testing unit that is easy to install and that is reusable.

SUMMARY OF THE INVENTION

The disadvantages of the prior art are overcome by the present invention which, in one aspect, is a pipe tester connector for coupling to a first pipe, having an interior region and an outside diameter, to a testing unit. A rigid cylindrical member has an interior surface and an exterior surface. The rigid cylindrical member defines a first side hole passing therethrough. A single continuous unitary flexible cup member includes circular floor portion and a central tubular portion extending upwardly therefrom. The central tubular portion has a top, an interior surface and an exterior surface that is complimentary in shape to the interior surface of the rigid cylindrical member and that is disposed therein. A first flexible sleeve extends from the top. The first flexible sleeve has an inside diameter that is complimentary to the outside diameter of the first pipe. The first flexible sleeve has a first position in which the first flexible sleeve is folded back onto the rigid cylindrical member and a second position in which the first flexible sleeve is unfolded so as to envelope an end portion of the first pipe. The central tubular portion defines a second side hole passing therethrough that is in alignment with the first side hole. A first hose clamp is disposed about the first flexible sleeve and is configured to secure the first flexible sleeve to the first pipe. An attachment unit includes a rigid insert, an attachment pipe, a first adapter and an attachment. The rigid insert is disposed against the tubular portion of the interior surface of the flexible cup. The rigid insert defines a hole passing therethrough that is in alignment with the first side hole and the second side hole. The attachment pipe passes through the first side hole, the second side hole and is affixed to the side hole of the rigid insert. An exterior portion of the attachment pipe extends outwardly from the exterior surface of the rigid cylindrical member. The first adapter includes an interior passage and an exterior surface. The interior passage is affixed to the exterior portion of the attachment pipe.

In another aspect, the invention is a pipe tester connecting device for coupling to a first pipe, having an interior region to a testing unit. A rigid cylindrical member has an interior surface and an exterior surface. The rigid cylindrical member defines a first side hole passing therethrough. A single continuous unitary flexible cup member includes a circular floor portion and a central tubular portion extending upwardly therefrom. The central tubular portion has a top, an interior surface and an exterior surface that is complimentary in shape to the interior surface of the rigid cylindrical member and that is disposed therein. A first flexible sleeve extends from the top. The first flexible sleeve has an inside diameter that is complimentary to the first pipe. The first flexible sleeve has a first position in which the first flexible sleeve is folded back onto the rigid cylindrical member and a second position in which the first flexible sleeve is unfolded so as to envelope an end portion of the first pipe. The central tubular portion includes a first ledge extending inwardly from the first flexible sleeve. The first ledge has an inside diameter corresponding to an inside diameter of the first pipe. The central tubular portion defines a second side hole passing therethrough that is in alignment with the first side hole. A first hose clamp is disposed about the first flexible sleeve and is configured to secure the first flexible sleeve to the first pipe. A hose bibb attachment unit includes a rigid insert, a threaded pipe, an adapter and a hose bibb. The rigid insert is disposed against the tubular portion of the interior surface of the flexible cup and defines a threaded hole passing therethrough that is in alignment with the first side hole and the second side hole. The threaded pipe passes through the first side hole, the second side hole and is screwed into the threaded hole of the rigid insert. An exterior portion of the threaded pipe extends outwardly from the exterior surface of the rigid cylindrical member. An adapter includes a threaded interior passage and a threaded exterior surface. The treaded interior passage is screwed on to the exterior portion of the threaded pipe. The hose bibb is coupled to the adapter and selectively places the interior region of the first pipe in fluid communication with the testing unit.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1A:
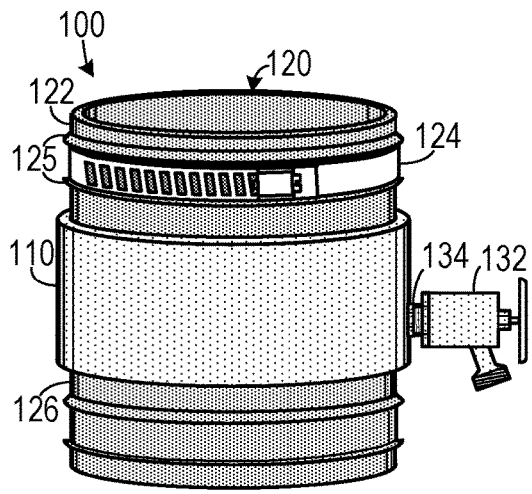
FIG. 1A is a perspective view of one embodiment of a pipe tester.
Figure 1B:
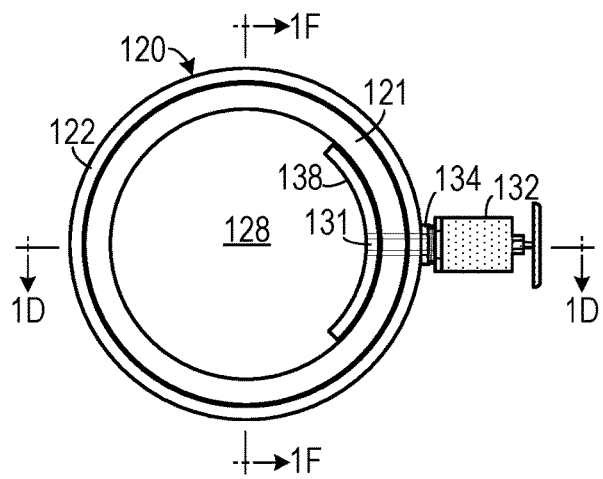
FIG. 1B is a top plan view of the embodiment shown in FIG. 1A.
Figure 1D:
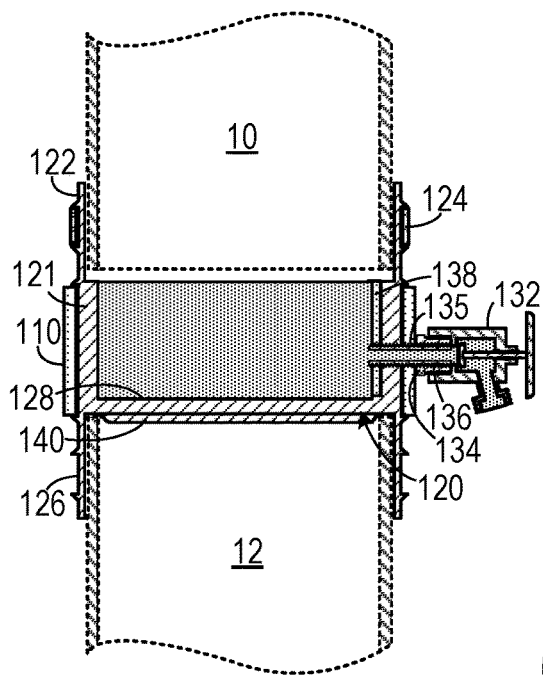
FIG. 1D is a cross-sectional view of the embodiment shown in FIG. 1B, taken along line 1D-1D.
Figure 1C:
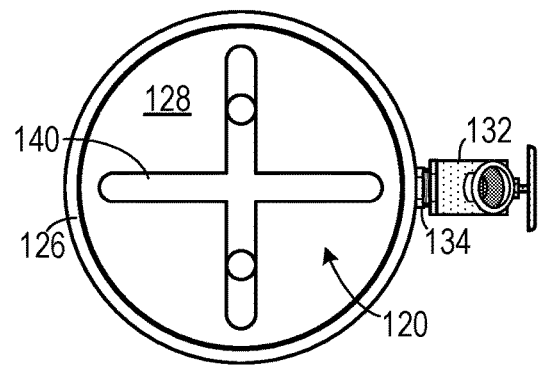
FIG. 1C is a bottom plan view of the embodiment shown in FIG. 1A.
Figure 1E:
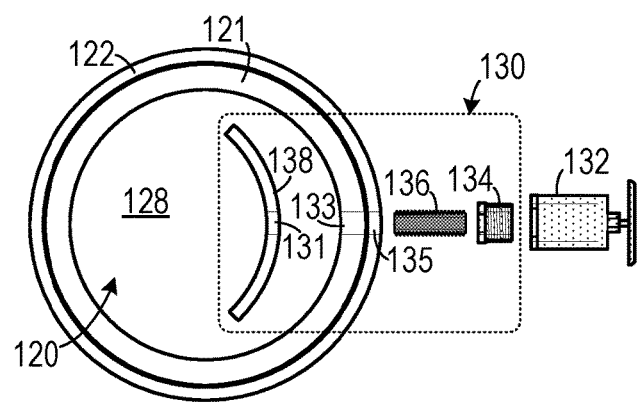
FIG. 1E is a top plan view of the embodiment shown in FIG. 1B with an exploded rendition of the hose bibb attachment.
Figure 1F:
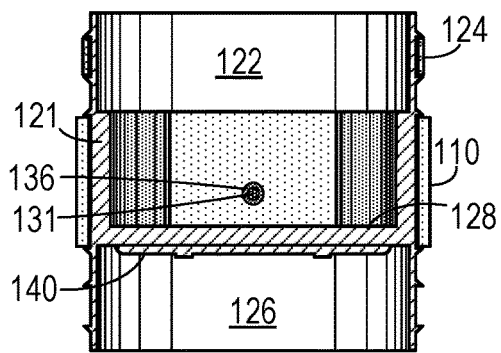
FIG. 1F is a cross-sectional view of the embodiment shown in FIG. 1B, taken along line 1F-1F.

A preferred embodiment of the invention is now described in detail. Referring to the drawings, like numbers indicate like parts throughout the views. Unless otherwise specifically indicated in the disclosure that follows, the drawings are not necessarily drawn to scale. The present disclosure should in no way be limited to the exemplary implementations and techniques illustrated in the drawings and described below. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIGS. 1A-1F, one embodiment of a pipe tester connector 100 that can be coupled a first pipe 10 includes a rigid cylindrical member 110 (which could include, for example, a section of polyvinyl chloride—PVC—pipe) that has an interior surface and an exterior surface. The rigid cylindrical member 110 has a first side hole 135 passing therethrough. A single continuous unitary flexible cup member 120 (which can be made from a synthetic rubber) is disposed within the rigid cylindrical member 110. A circular floor portion 128 is integrated into the flexible cup member and a central tubular portion 121 extends upwardly from the floor portion 128. The circular floor portion 128 has a bottom side into which can be formed at least one ridge 140 to reduce flexibility of the circular floor 128.

The central tubular portion 121 has a top, an interior surface and an exterior surface that is complimentary in shape to the interior surface of the rigid cylindrical member 110. A second side hole 133 is aligned with the first side hole 135 and passes through the tubular portion 121. A first flexible sleeve 122 extends upwardly from the top. The first flexible sleeve has an inside diameter that is complimentary to the first pipe 10. A first hose clamp 124 is disposed about the first flexible sleeve 122 and secures the first flexible sleeve 122 to the first pipe 10. The first flexible sleeve 122 can include a pair of spaced apart circular ridges 125 extending outwardly therefrom for holding the hose clamp 124 in a fixed relationship to the first flexible sleeve 122.

In one embodiment, an attachment unit 130 includes a rigid insert 138 that is placed against the tubular portion 121 of the interior surface of the flexible cup 120. The rigid insert 138 has an insert side hole 131 passing therethrough, which is in alignment with the first side hole 133 and the second side hole. An attachment pipe 136 passes through the first side hole 135, the second side hole 133 and the insert side hole 131. Pipe 136 is affixed to the rigid insert 138. An exterior portion of the attachment pipe 136 extends outwardly from the exterior surface of the rigid cylindrical member 110. A first adapter 134 includes an interior passage and an exterior surface. The interior passage affixed to the exterior portion of the pipe 136. An attachment, such as a hose bibb 132, is coupled to the adapter 134 and selectively places the interior region of the first pipe 10 in fluid communication with a testing unit. In one embodiment, hole 131, pipe 136 and adapter 134 are all threaded. In such and embodiment, pipe 136 is screwed into hole 131, adapter 134 is screwed into pipe 136 and hose bibb 132 is screwed into adapter 134. In alternate embodiments, these items are affixed to each other by alternate means, including gluing, chemical welding, etc.

In the embodiment shown in FIGS. 1A-1F, the rigid insert 138 has an exterior surface that is complimentary in shape to the interior surface of the central tubular portion 121. In this embodiment the rigid insert 138 can be made of a longitudinal cylindric section of PVC.

A second flexible sleeve 126 may extend downwardly from the circular floor portion 128 beyond the rigid cylindrical member 110 and may be used to rest the pipe tester connector 100 on a second section of pipe 12 during installation. Ridges can be provided for securing this sleeve 126 to pipe 12 using a hose clamp (not shown) if desired.

Figure 2A:
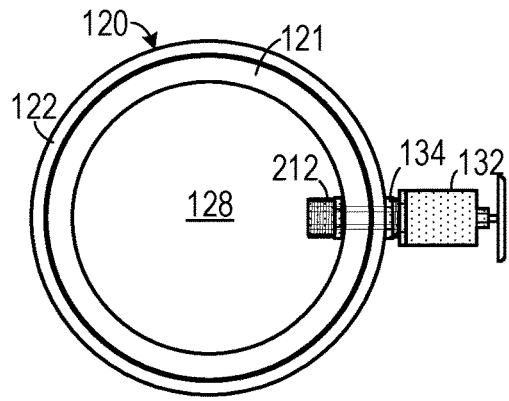
FIG. 2A is a top plan view of a second embodiment of a pipe tester.
Figure 2B:
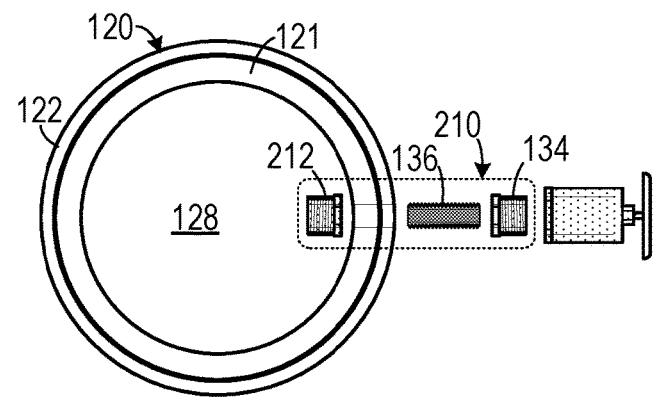
FIG. 2B is a top plan view of the embodiment shown in FIG. 2A with an exploded rendition of the hose bibb attachment.

In an alternate embodiment, as shown in FIGS. 2A and 2B, the attachment unit 210 can use a second adapter 212 to secure the pipe 136 to the interior surface of the tubular portion 121.

Figure 3:
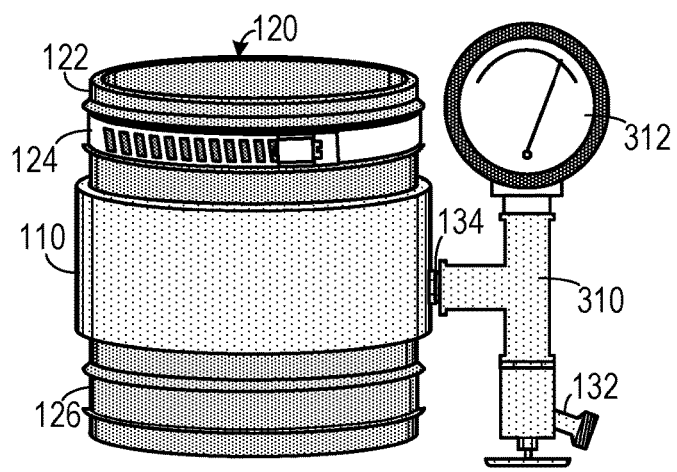
FIG. 3 is a perspective view of a third embodiment of a pipe tester.

As shown in FIG. 3, a T-fitting 310 can be affixed to the first adapter 134, to which may be affixed a testing unit 312 (such as a pressure gauge) and a hose bibb 132 used to fill and drain the pipe 10.

Figure 4A:
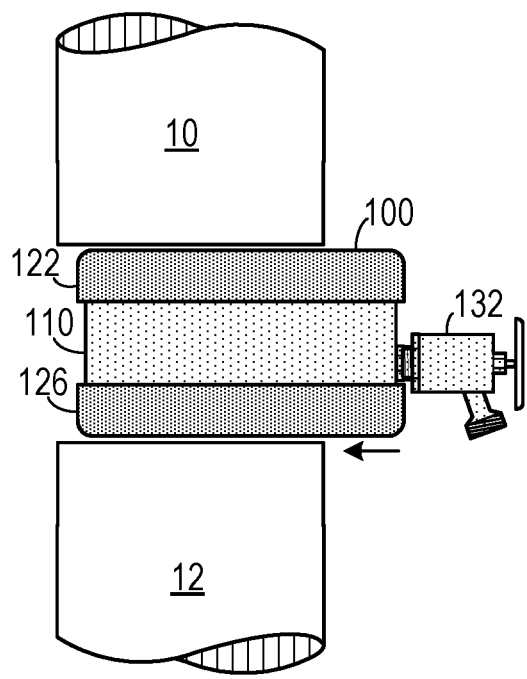
FIG. 4A is a side elevational view of a tester during installation.
Figure 4B:
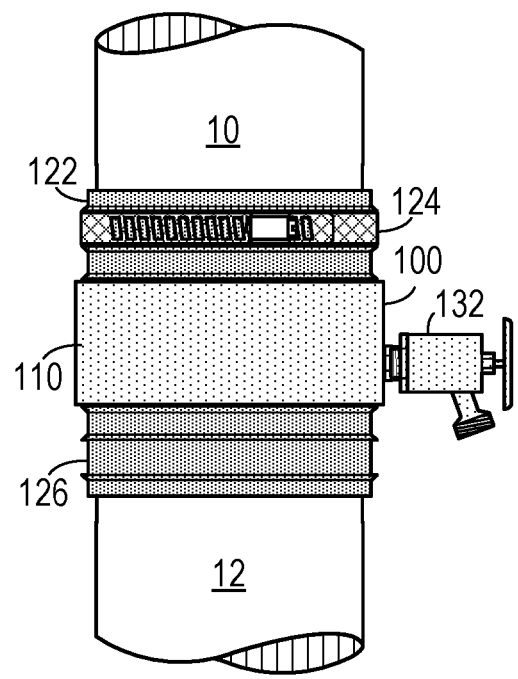
FIG. 4B is a side elevational view of the tester shown in FIG. 4A after installation.

As shown in FIG. 4A, the pipe tester connector 100 is installed by folding flexible sleeves 122 and 126 over the rigid cylindrical member 110 into a first position. Once folded, the pipe tester connector 100 is slipped into the gap between pipe sections 10 and 12. Sleeves 122 and 126 are then unfolded so that they envelope an end portion of pipe sections 10 and 12 and a hose clamp 124 secures the first sleeve 122 to pipe section 10.

Once secured, testing of pipe section 10 can be performed. After testing, the pipe tester connector 100 can be removed by removing the hose clamp 124, folding back sleeves 122 and 126, slipping the pipe tester connector 100 out of the gap and replacing it with an expansion joint (not shown, but which can be of the type disclosed in U.S. Pat. No. 9,982,823, which is incorporated herein by reference).

In one commercial embodiment, the pipe tester connector fits inside of a 2½" void between two fixed pipes and connects the two pipes together. The top and bottom flexible sleeve material folds down and up onto the PVC rigid middle pipe and is folded back onto the connecting pipes to water test the plumbing drainage system that is required by many plumbing codes. This embodiment can include a water stop built into the bottom floor to hold back the water that fills up the above drainage pipe to a minimum 10 foot head of water or more. A hose bibb connection into the pipe tester connector feeds the water up into the above 10 feet or more of pipe. The tester is removed after the test and replaced by a mechanical coupling for normal use of the piping. The tester can be reused over and over many times.

Although specific advantages have been enumerated above, various embodiments may include some, none, or all of the enumerated advantages. Other technical advantages may become readily apparent to one of ordinary skill in the art after review of the following figures and description. It is understood that, although exemplary embodiments are illustrated in the figures and described below, the principles of the present disclosure may be implemented using any number of techniques, whether currently known or not. Modifications, additions, or omissions may be made to the systems, apparatuses, and methods described herein without departing from the scope of the invention. The components of the systems and apparatuses may be integrated or separated. The operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set. It is intended that the claims and claim elements recited below do not invoke 35 U.S.C. 112(f) unless the words "means for" or "step for" are explicitly used in the particular claim. The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A pipe tester connector for coupling to a first pipe, having an interior region and an outside diameter, to a testing unit, comprising:
   (a) a rigid cylindrical member having an interior surface and an exterior surface, the rigid cylindrical member defining a first side hole passing therethrough;
   (b) a single continuous unitary flexible cup member including a circular floor portion and a central tubular portion extending upwardly therefrom, the central tubular portion having a top, an interior surface and an exterior surface that is complimentary in shape to the interior surface of the rigid cylindrical member and disposed therein, a first flexible sleeve extending from the top, the first flexible sleeve having an inside diameter that is complimentary to the outside diameter of the first pipe, the first flexible sleeve having a first position in which the first flexible sleeve is folded back onto the rigid cylindrical member and a second position in which the first flexible sleeve is unfolded so as to envelope an end portion of the first pipe, the central tubular portion defining a second side hole passing therethrough that is in alignment with the first side hole;
   (c) a first hose clamp disposed about the first flexible sleeve and configured to secure the first flexible sleeve to the first pipe; and
   (d) an attachment unit, including:
      (i) a rigid insert disposed against the tubular portion of the interior surface of the flexible cup, the rigid insert defining an insert side hole passing therethrough that is in alignment with the first side hole and the second side hole;
      (ii) an attachment pipe that passes through the first side hole, the second side hole and the insert side hole, and that is affixed to the rigid insert, an exterior portion of the attachment pipe extending outwardly from the exterior surface of the rigid cylindrical member; and
      (iii) a first adapter that includes an interior passage and an exterior surface, the interior passage affixed to the exterior portion of the attachment pipe.

2. The pipe tester connector of claim 1, further comprising an attachment that is coupled to the adapter that selectively places the interior region of the first pipe in fluid communication with the testing unit.

3. The pipe tester connector of claim 1, wherein the rigid insert has an exterior surface that is complimentary in shape to the interior surface of the central tubular portion.

4. The pipe tester connector of claim 1, wherein the rigid insert comprises a second adapter that includes an interior passage, the interior passage affixed to an interior portion of the attachment pipe.

5. The pipe tester connector of claim 1, further comprising a second flexible sleeve extending downwardly from the circular floor portion beyond the rigid cylindrical member and having an inside diameter that is complimentary to a second pipe that is in alignment with the first pipe, the second flexible sleeve having a first position, in which the first flexible sleeve is folded back onto the rigid cylindrical member, and a second position in which the second flexible sleeve is unfolded so as to envelope an end portion of the second pipe, wherein the central tubular portion, the first flexible sleeve and the second flexible sleeve are all one piece.

6. The pipe tester connector of claim 1, wherein the circular floor has a bottom side into which is formed at least one ridge extending therefrom so as to reduce flexibility of the circular floor.

7. The pipe tester connector of claim 1, wherein the adapter comprises a hose bib.

8. The pipe coupling of claim 1, wherein the rigid cylindrical member comprises a section of polyvinyl chloride pipe.

9. The pipe coupling of claim 1, wherein the flexible cylindrical member comprises a synthetic rubber.

10. The pipe coupling of claim 1, wherein the rigid insert comprises a longitudinal cylindric section including polyvinyl chloride.

11. The pipe coupling of claim 1, wherein the first flexible sleeve includes a pair of spaced apart circular ridges extending outwardly therefrom and defining a space there-between, the space configured to hold the hose clamp in a fixed relationship to the first flexible sleeve.

12. A pipe tester connecting device for coupling to a first pipe having an interior region to a testing unit, comprising:
   (a) a rigid cylindrical member having an interior surface and an exterior surface, the rigid cylindrical member defining a first side hole passing therethrough;
   (b) a single continuous unitary flexible cup member including a circular floor portion and a central tubular portion extending upwardly therefrom, the central tubular portion having a top, an interior surface and an exterior surface that is complimentary in shape to the interior surface of the rigid cylindrical member and disposed therein, a first flexible sleeve extending from the top, the first flexible sleeve having an inside diameter that is complimentary to the first pipe, the first flexible sleeve having a first position in which the first flexible sleeve is folded back onto the rigid cylindrical member and a second position in which the first flexible sleeve is unfolded so as to envelope an end portion of the first pipe, the central tubular portion including a first ledge extending inwardly from the first flexible sleeve, the first ledge having an inside diameter corresponding to an inside diameter of the first pipe, the central tubular portion defining a second side hole passing therethrough that is in alignment with the first side hole;

(c) a first hose clamp disposed about the first flexible sleeve and configured to secure the first flexible sleeve to the first pipe;

(d) a hose bibb attachment unit, including:
  (i) a rigid insert disposed against the tubular portion of the interior surface of the flexible cup and defining a threaded hole passing therethrough that is in alignment with the first side hole and the second side hole;
  (ii) a threaded pipe that passes through the first side hole, the second side hole and that is screwed into the threaded hole of the rigid insert, an exterior portion of the threaded pipe extending outwardly from the exterior surface of the rigid cylindrical member;
  (iii) an adapter that includes a threaded interior passage and a threaded exterior surface, the treaded interior passage screwed on to the exterior portion of the threaded pipe; and (e) a hose bibb that is coupled to the adapter that selectively places the interior region of the first pipe in fluid communication with the testing unit.

13. The pipe tester connecting device of claim 12, wherein the rigid insert has an exterior surface that is complimentary in shape to the interior surface of the central tubular portion.

14. The pipe tester connector of claim 12, wherein the rigid insert comprises a second adapter that includes an interior passage, the interior passage affixed to an interior portion of the attachment pipe.

15. The pipe tester connecting device of claim 12, further comprising a second flexible sleeve extending downwardly from the circular floor portion beyond the rigid cylindrical member and having an inside diameter that is complimentary to a second pipe that is in alignment with the first pipe, the second flexible sleeve having a first position, in which the first flexible sleeve is folded back onto the rigid cylindrical member, and a second position in which the second flexible sleeve is unfolded so as to envelope an end portion of the second pipe, wherein the central tubular portion, the first flexible sleeve and the second flexible sleeve are all one piece.

16. The pipe tester connecting device of claim 12, wherein the circular floor has a bottom side into which is formed at least one ridge extending therefrom so as to reduce flexibility of the circular floor.

17. The pipe tester connecting device of claim 12, wherein the rigid cylindrical member comprises a section of polyvinyl chloride pipe.

18. The pipe tester connecting device of claim 12, wherein the flexible cylindrical member comprises a synthetic rubber.

19. The pipe tester connecting device of claim 12, wherein the rigid insert comprises a longitudinal cylindric section including polyvinyl chloride.

20. The pipe tester connecting device of claim 12, wherein the first flexible sleeve includes a pair of spaced apart circular ridges extending outwardly therefrom and defining a space there-between, the space configured to hold the hose clamp in a fixed relationship to the first flexible sleeve.

* * * * *